United States Patent [19]

Smith

[11] 4,205,875
[45] Jun. 3, 1980

[54] ROOF VENT WINDOW

[75] Inventor: Michael W. Smith, Torrance, Calif.

[73] Assignees: West Custom Windows, Inc., Harbor City; David Carl Blomgren, Menlo Park, both of Calif.; part interest to each

[21] Appl. No.: 965,156

[22] Filed: Nov. 30, 1978

[51] Int. Cl.² ............................................. B60H 1/26
[52] U.S. Cl. ..................................... 296/218; 98/2.14
[58] Field of Search .................. 296/137 R, 137 B; 98/2.14; 49/397, 400, 449, 465

[56] References Cited

U.S. PATENT DOCUMENTS

| | | | |
|---|---|---|---|
| 2,891,290 | 6/1959 | Hauck | 49/397 X |
| 3,972,558 | 8/1976 | Horn | 296/137 B |
| 3,974,753 | 8/1976 | Blomgren et al. | 98/2.14 |
| 4,038,910 | 8/1977 | Kneusels et al. | 98/2.14 |
| 4,115,955 | 9/1978 | Aldrich | 49/465 X |
| 4,118,063 | 10/1978 | Biemert et al. | 296/137 B |
| 4,126,352 | 11/1978 | Vogel | 296/137 B |
| 4,130,966 | 12/1978 | Kujawa, Jr. et al. | 296/137 B X |
| 4,131,970 | 1/1979 | Le Van | 296/137 B X |
| 4,133,576 | 1/1979 | Chrysler | 49/465 X |
| 4,142,761 | 3/1979 | Lutz et al. | 49/465 X |

Primary Examiner—John J. Love
Assistant Examiner—Norman L. Stack
Attorney, Agent, or Firm—Fulwider, Patton, Rieber, Lee & Utecht

[57] ABSTRACT

There is disclosed an automotive roof vent window designed for ease of retrofit installation and ease of removal of the vent window panel after installation. The vent window has a main frame and clamping trim ring secured thereto with self tapping screws. The vent window panel is pivotally mounted to the main frame by hinged brackets having a slotted aperture which receives threaded pins permanently carried by the vent window panel and clamped to the brackets by thumb nuts. The opposite edge of the window panel is secured by a toggle latch assembly that is pivotally engaged to a mounting bracket of the window frame by a pin removably seated in slotted apertures of the bracket. The pin has indexing flats to permit its withdrawal when rotated to align the flats with the slots of the apertures. The pin is securely locked in the assembly by a dependent lever having resilient detenting tabs.

11 Claims, 8 Drawing Figures

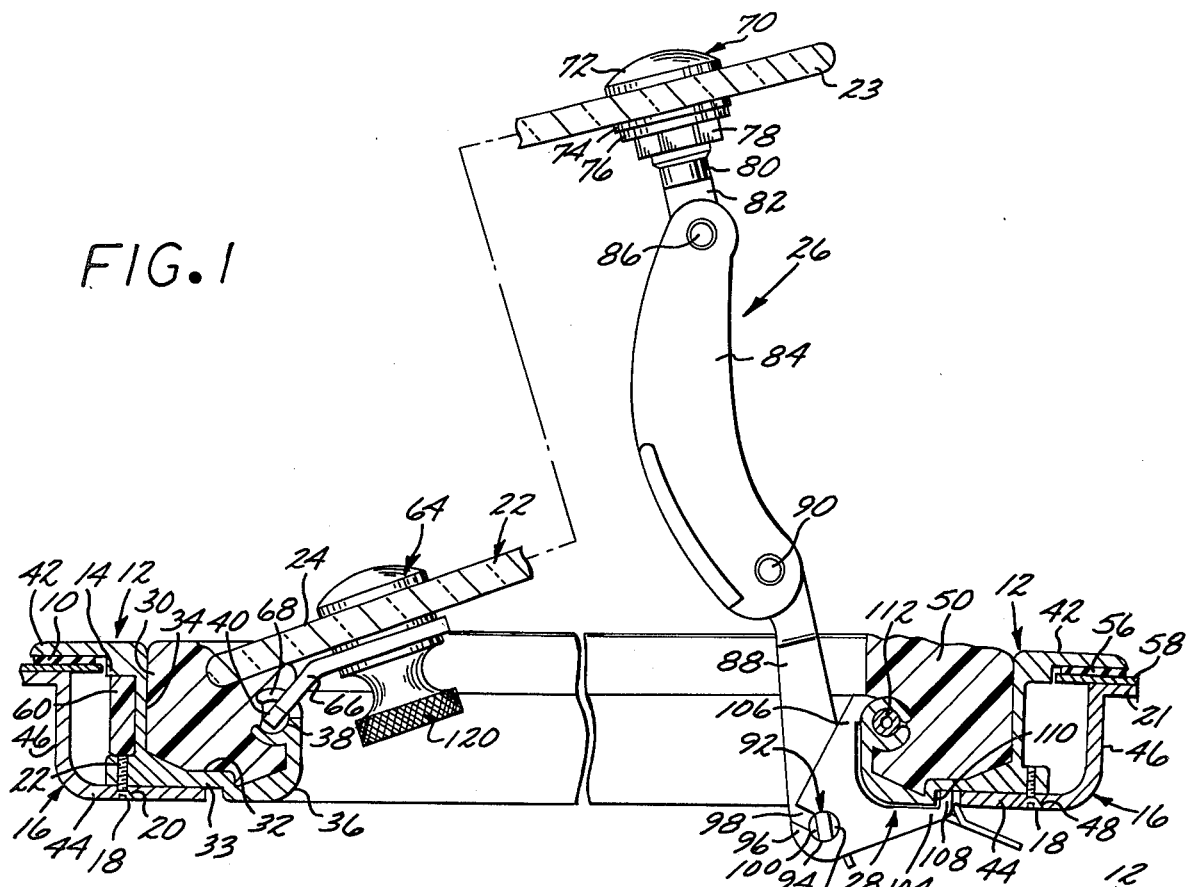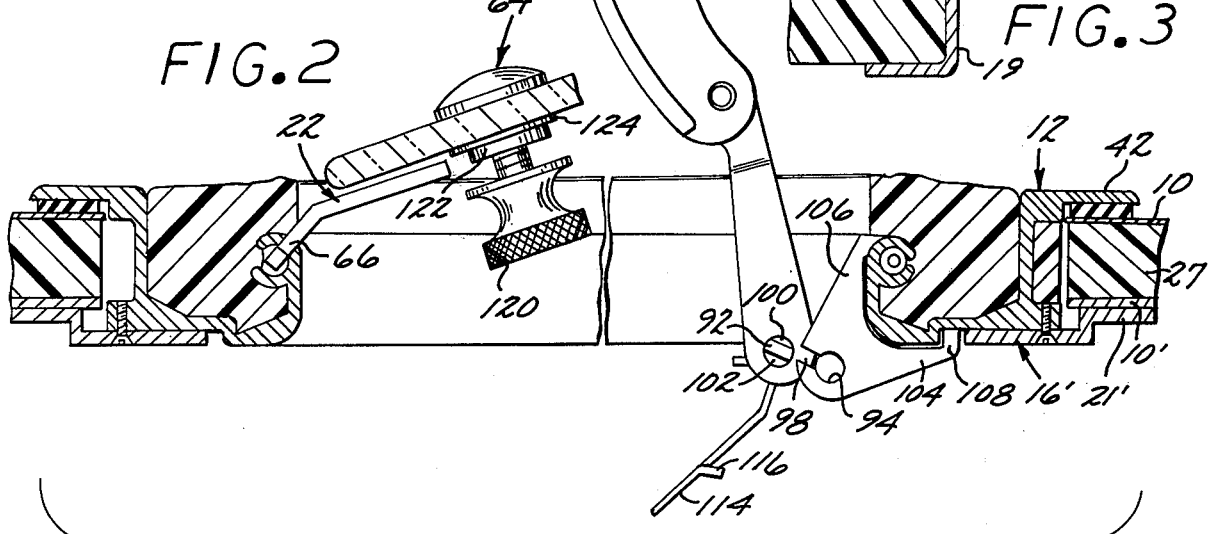

4,205,875

ROOF VENT WINDOW

BACKGROUND OF THE INVENTION

1. Field of Invention

This invention relates to an automotive vent window and, in particular, to a window for the retrofit installation in the roof of an automotive vehicle.

2. Brief Statement of the Prior Art

Roof vent windows have found increasing popularity in automotive vehicles. The window panels typically are hinged at their leading edge and have extendable locking levers along their rear edge to support the window in an extended position and to lock the window in its closed position. The increased visibility and the greatly increased air circulation through the car are major factors in the rapidly increasing popularity of this window.

One of the features which is commonly desired by consumers is that the window panel be removable and the ease of removal of the window is a factor which is considered in the selection and purchase of the windows by the public.

There have been some patents which have recently issued on window designs for automotive vehicles such as U.S. Pat No. 3,974,753, and which shows windows formed of extruded frame members which are cold rolled into generally rectangular configurations. The structure of this invention permits such manufacturing of the frame and trim ring members and provides a window having an easily removable window panel.

BRIEF STATEMENT OF THE INVENTION

The invention comprises an automotive roof vent window having a construction that permits facile removal of the vent window panel after its installation. The removability of the vent window panel is achieved by use of a latch mechanism pivotally secured to a mounting bracket on the frame of the window with a pin that fits in slotted apertures of the mounting bracket and which has end flats to index with the slot and permit its withdrawal when the flats are aligned with the slots. The pin is fixedly secured to a lever having resilient detenting tabs which engage against an abuttment of the bracket to secure the lever and its dependent pin against rotation, thus firmly capturing the pin within the apertures of the bracket and safely securing the assembly.

The invention also comprises hinge members on the leading edge of the assembly which are permanently and pivotally secured to the frame member and which are removably secured to the roof vent panel.

BRIEF DESCRIPTION OF THE DRAWINGS

The invention will be described with reference to the FIGURES of which:

FIG. 1 is an elevational, sectional view of the roof vent window in the panel open position;

FIG. 2 is an illustration similar to FIG. 1, showing the removal of the window panel;

FIG. 3 illustrates an alternative structure for the frame and trim ring members of the assembly;

DESCRIPTION OF PREFERRED EMBODIMENTS

Figure 4:
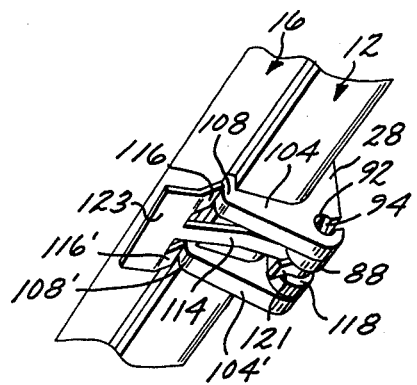
FIG. 4 is a perspective view of the pin lever of the latch mechanism in its locked position.

Referring now to FIG. 1, the roof vent window of the invention is shown in elevational cross-sectional view as installed in the roof of a vehicle. The vehicle roof 10 is modified to include a generally rectangular opening into which is seated the window frame member 12. The opening is cut into the roof of the vehicle following a guide or template which closely conforms to the abuttment edge 14 of frame 12. Trim ring 16 is coextensive with frame 12 and is secured thereto by a plurality of self tapping sheet metal screws 18 which are received in the groove 20 of flange 22 carried by the frame 12. The vent panel 22 is pivotally mounted to the frame 12 by one or more hinge plates 24 along the leading edge of the panel. At its trailing edge, the panel carries one or more latch mechanisms generally indicated at 26 which are pivotally mounted to latch mounting brackets 28 carried along the inner trailing edge of frame 12. As will be explained in greater detail hereinafter, the latch mechanism 26 is a folding latch mechanism which is effective in permitting the pivotal movement of the panel through arc from 0° to about 40°, preferably from 1° to about 35° and which will fold into a locked position when the panel is in its closed position.

The frame member 12 and the trim ring 16 are extruded metal forms, typically of aluminum. These members are formed into a generally rectangular form such as shown in the aforecited U.S. Pat. No. 3,974,753 by stretch forming the metal extrusions and the corners are arcuate with a sufficient radius of curvature to permit this metal forming step. The frame member 12 has a generally upwardly open channel 30 having a web 32 and opposite and parallel sides 34 and 36. The inboard side 36 of this channel carries an outwardly facing arcuate channel 38 along its upper edge which has an open, coextensive slot 40. The opposite side 34 carries a peripheral, flat flange 42 dependent from its upper edge.

The trim ring, also of extruded metal form, is an angle member having a base 44 and an upright side 46. The trim ring has a plurality of spaced apertures 48 which receive the screws 18 that extend into self-tapped apertures in flange 22. The apertures 48 in the trim ring are aligned with the groove 20 of flange 22 that receives the self-tapping screws 18.

A resilient seal ring 50 which is formed of natural or synthetic rubber, polyurethanes and the like is received in the upwardly open channel 30. The undersurface of the peripheral flange 42 of the frame seats against seal ring 56 which is secured between the undersurface of flange 42 and the upper surface of the roof 10. The internal trim such as the headliner 58 of the vehicle is clamped against the inner surface of the roof by the upper edge of the trim ring 16.

The undersurface of flange 42 of the frame has a coextensive shoulder 14 which abuts the cut edge of the roof 10 and orients the frame in the assembly. Spacer blocks 60 are positioned in the channel which is formed between the shoulder 14 and the flange 22 of the frame to insure that the frame is not inadvertently installed with the roof edge projecting into this channel. A suitable material which can be used for the spacer blocks 60 is adhesively-backed polyvinyl chloride.

The undersurface of the web 32 of channel 30 of the main frame preferably has an inset portion 33 to provide a recessed surface for seating of the base 44 of trim ring 16 thereby providing a flush mounting of the trim ring to the frame and a pleasing appearance to the assembly.

As previously mentioned, the vent panel 22 is pivotally mounted along its forward edge to the frame 12 by one or more hinge plates 24. Preferably two, laterally disposed hinge plates 24, are employed. Each hinge plate 24 is secured to the leading edge of the vent panel 22 by a machine bolt 64 and has a downwardly bent portion 66. The bent portion 66 has a transverse slot (not shown) which receives a tongue 68 formed by two parallel slots in the upper edge of the arcuate channel 38. The structure of this hinge engagement is further illustrated and described with reference to FIGS. 7 and 8.

The folding latch mechanism 26 is mounted along the trailing edge 23 of the roof vent panel 22. Preferably two of the folding latch mechanisms 26 are employed, laterally disposed along the trailing edge 23. The latch mechanisms are fixedly secured to the roof panel 23 by bolt 70 having head 72, sealing washer 74 and washer 76 secured by lock nut 78. The bolt 70 has a shank portion 80 with flats 82 cut on its opposite sides and received within the end of the generally channel-shaped clasp member 84 of the latch mechanism 26. Pin 86 is permanently seated in aligned apertures through the side walls of the channel clasp member 84 and is received in an aligned aperture in the end of the shank 80 of bolt 70.

The opposite end of the clasp member 84 is pivotally mounted to toggle member 88 by permanently seated pin 90. The toggle member 88 pivotally carries pin 92 which is received in aligned apertures 94 in each of the arms 96 of latch mounting bracket 28. The apertures 92 in the arms 96 of the latch mounting bracket 28 open to a slot 98. As described in greater detail hereinafter, the pin 94 has distal and parallel flats 100 and 102 which can be aligned with the slots 98 of the bracket to permit retraction of the pin 100 from apertures 92.

The latch mounting brackets 28 are bifurcated with legs 104 and 106 which bear suitable means to attach to frame member 12 such as lip 108 on leg 104 which engages against the off set shoulder 110 in the undersurface of the frame member. The leg 106 has a shoulder, not illustrated, which projects through a slot cut in the arcuate channel 38 and this shoulder has an aperture to align with the arcuate channel and receive a roll pin 112 to fixedly secure the latch mounting bracket to the frame 12.

Referring now to FIG. 2, the removal of the vent panel will be illustrated and described. As shown in FIG. 2, the pin 92 has been rotated to permit its flats 100 and 102 to be aligned with groove 98, thereby permitting extraction of the pin through slots 98 from the aligned apertures 94 of the mounting bracket 28. The rotation of the pin to this position is achieved by the movement of the lever 114 which is fixedly secured to the pin. The lever has resilient detent means in the form of tabs 116 which resiliently engage with the outside shoulder of the lip 108 of the mounting bracket in the manner illustrated in FIG. 1 whereby the lever is firmly locked in a position securing the flats of pin 92 out of alignment with the slots 98.

The panel 22 can be detached from its hinged engagement with the leading edge of the assembly by loosening of the thumb nut 120 which is threadably engaged on the machine bolt 64. The latter is permanently secured to the vent panel 22 by nut 122 and sealing washer 124.

The embodiment of FIG. 2 illustrates a slightly different configuration of the trim ring 16'. In this illustration, the trim ring has its offset, peripheral flange 21' separated from the peripheral flange 42 of frame 12 by a substantial distance, e.g., from ⅜ to about ¾ of an inch and the like. This structure is suited for fitting to double roof vehicles which have an upper roof 10 and a spaced-apart lower roof 10'. In this embodiment, a spacer block 27 is inserted between the spaced-apart edges of the roof panels 10 and 10'. Preferably, the spacer block 27 is adhesively backed to permit its permanent installation between the roof panels.

The material which is ideally suited for use as the spacer block 27 comprises a plastic foam material commercially available under the trade designation Ethafoam from the Dow Chemical Co., Midland, Mich. The latter is a cross-linked, rigid polyethylene foam of an intermediate density and a high compressive strength.

Referring now to FIG. 3, there is illustrated an alternative structure for the trim ring used in the assembly. As there illustrated, the main frame 12 has the same configuration as shown in FIG. 1, however, the trim ring 15 has a generally channel shape with an outwardly formed channel 17 and a downwardly dependent angle 19. This trim ring is for applications such as vans and the like which have a relatively thick roof panel, e.g., up to about 1½ inches in thickness. The roof panel is formed of the conventional metal roof with a thick headliner or insulation 11. The downwardly dependent angle 19 of the trim ring 15 secures the inward edge of the headliner in the assembly.

Figure 5:
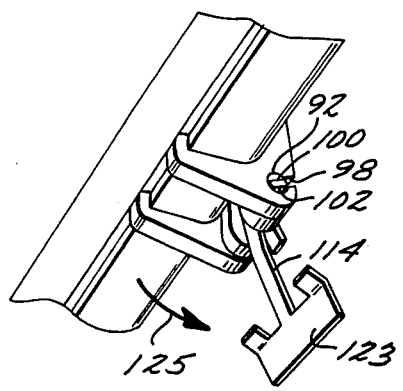
FIG. 5 is a perspective view of the pin lever in its open or pin extraction position.

The operation of the releasable latch mechanism will be described with reference to FIGS. 3–5. FIG. 3 is a perspective view of the latch mounting bracket which is shown, secured to the undersurface of the frame 12 with its associated trim ring 16. The mounting bracket has a pair of parallel legs 104 and 104' which have the previously mentioned aligned bores 94 that releasably receive the opposite ends of pin 92. Pin 92 is pivotally secured in the end of the toggle member 88 which is slotted at 118 to receive the lever 114. Lever 114 has a hook-shaped end 121 which resiliently binds about pin 94. Lever 114 is generally T-shaped with a cross bar 123 that has resilient, bent tabs 116 and 116'. As previously mentioned, these tabs engage against the outer shoulders of lips 108 and 108' of the mounting bracket 28, serving as resilient detents to lock the lever 114 in the position illustrated in FIG. 3.

Figure 6:
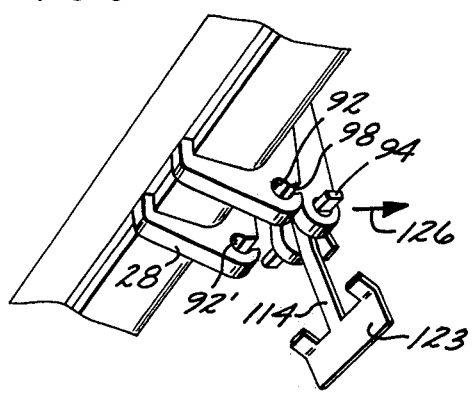
FIG. 6 illustrates the extraction of the pin and disassembly of the latch mechanism.

The removal of the panel is effected with the panel in its raised or upright position as illustrated in FIG. 1. The removal is accomplished by grasping cross bar 122 of lever 114 and swinging lever 114 in the direction indicated by the arrowhead line 125. This movement rotates pin 92 to that position shown in FIG. 5 where the distal flats 100 and 102 of the pin are aligned with the groove 98. The pin 92 can then be extracted from the aligned apertures 92 and 92' simply by movement in the direction by the arrowhead line 126 of FIG. 6.

Figure 7:
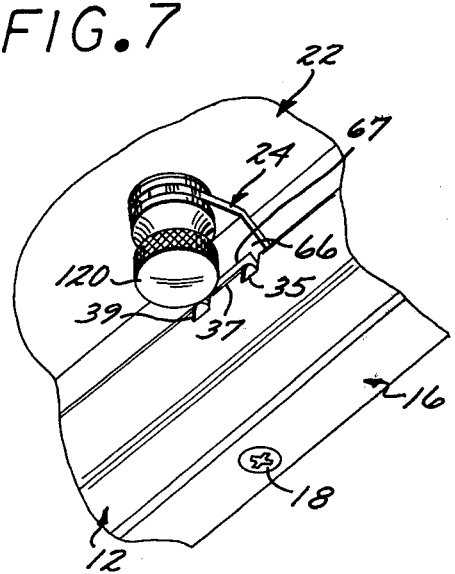
FIG. 7 is a perspective view of the hinge used in the invention.
Figure 8:
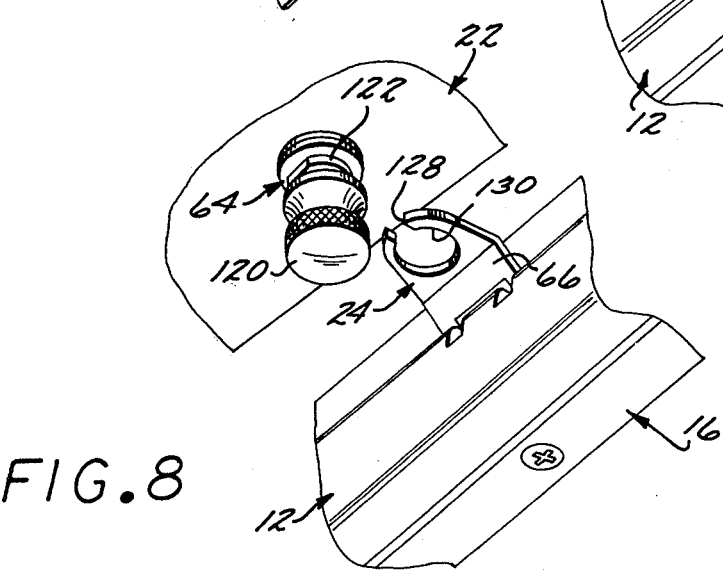
FIG. 8 illustrates the disassembly of the hinge.

The disengagement of the leading edge of the panel from the assembly is illustrated in FIG. 7 and 8. As shown in FIG. 7, the leading edge of the panel 22 is pivotally secured in the assembly by the hinge plate 24. Plate 24 has the bent portion 66 which has a slot 67 that receives a tongue portion 37 that is formed by a pair of parallel grooves 35 and 39 in the arcuate channel 38 shown in FIG. 1. The panel 22 is freed from the hinge plate 24 by loosening thumb nut 120 as shown in FIG. 7 to permit the bot 64 to pass through the distal slot 128 intersecting the aperture 130 of the hinge plate 24.

The invention has been described with reference to the illustrated and presently preferred mode of practice. It is not intended that the invention be unduly limited by this description of the presently preferred embodiment. Instead, it is intended that the invention be defined by the means, and their obvious equivalents, set forth in the following claims.

What is claimed is:

1. In an automotive roof vent window having a frame for mounting in an opening in the roof of a vehicle and extending about the periphery thereof, a trim ring substantially coextensive with said frame, fastening means to secure said frame and trim ring in compressive engagement with the edge of said roof about said opening, and a vent closure panel having substantially the same shape and dimensions as said opening, the improvement comprising:
   (a) hinge means secured to the leading edge of said panel and pivotally mounted to said frame;
   (b) latch means comprising latch bracket means carried by said frame and an assembly of a clasp member and a toggle member pivotally, end-to-end connected between the trailing edge of said panel and said latch bracket means; and
   (c) aperture and intersecting slot means in said latch bracket means to removably receive a pin member having indexing flats to permit insertion through said slot means, arm means fixedly carried by said pin means to rotate said pin and move said flats into and out of alignment with said slot means, and resilient detenting means carried by said arm means to engage said bracket and restrain rotation of said pin means.

2. The improvement of claim 1 wherein said hinge means comprises a pair of hinge plates, each plate having a slot to receive tongue means of said frame member and each having a distal, open-slotted aperture to receive a respective pin carried by said panel.

3. The improvement of claim 1 wherein said latch means comprises a pair of said assembly of latch clasp and toggle members, each carried by respective latch brackets secured to the trailing portion of said frame.

4. The improvement of claim 3 wherein said latch brackets comprise a bifurcated bracket having legs that engage against the main frame and fastening means to secure said brackets to said frame.

5. The improvement of claim 4 wherein said latch brackets include a pair of spaced-apart arms to receive the free end of said toggle member and having axially aligned apertures for receiving the pin carried at the free end of said toggle member.

6. The improvement of claim 5 wherein said arm means comprises a T-shaped lever having a cross bar with dependent resilient bent tabs which resiliently engage against shoulder abutments of said latch bracket means.

7. The improvement of claim 1 wherein said latch means permits pivotal movement of said panel through a secured arc of from 0° to about 40°.

8. The improvement of claim 1 wherein said latch means permits pivotal movement of said panel through a secured arc of from 0° to 35°.

9. The improvement of claim 1 wherein said vent closure panel is a glass window.

10. The improvement of claim 1 wherein said hinge means comprises a plate having a bend to provide a flat portion for attachment to said closure panel and an offset, inclined portion bearing said slot means to receive said tongue of said frame.

11. The improvement of claim 10 wherein said hinge plate has an aperture in its flat portion to receive a bolt for attachment to said vent panel and wherein said flat portion of said hinge plate has a slot intersecting said aperture to permit removal of said panel therefrom.

* * * * *